United States Patent Office 3,284,332
Patented Nov. 8, 1966

3,284,332
FUEL CELL ELECTRODE
Elroy M. Gladrow, Edison Township, Middlesex County, and Charles E. Thompson, Fanwood, N.J., assignors to Esso Research and Engineering Company, a corporation of Delaware
No Drawing. Filed May 29, 1961, Ser. No. 113,075
6 Claims. (Cl. 204—284)

This invention relates to the production of electrical energy by electrochemical oxidation of combustible fuels. In particular, this invention is concerned with improvements in electrodes for use in electrochemical cells comprising a carbon structure associated with a metal catalyst and to a novel method for the preparation of such electrodes. More particularly, this invention relates to novel methods for the distribution of catalyst within a carbon comprising fuel cell electrode and for binding metal and carbon so as to increase the catalytic effect of such metal in the promotion of fuel cell reactions.

In the interest of simplicity, this invention will be primarily described with reference to the preparation of electrodes for use in power-producing fuel cells. However, it should be understood that electrodes prepared in accordance with this process may also be employed advantageously in electrolytic cells wherein electrical energy is consumed in the oxidation of an organic fuel.

Heretofore, porous carbon electrodes have been impregnated with catalyst by reducing the pressure on the material to be treated and flooding the porous structure with a relatively concentrated aqueous solution containing the catalyst yielding material in the form of a water soluble compound, e.g. a 0.15 molar solution of chloroplatinic acid where the catalyst to be left on the conductor base is platinum. Adsorption of the catalyst containing material is effected and the electrode is ordinarily heated to elevated temperatures in an inert atmosphere to decompose the adsorbed material leaving the metal ion on the surface of the conductor base. Where the intended catalyst comprises elemental metal this step is followed by reduction at elevated temperatures with hydrogen or other reducing agents. With other catalysts, such as cobalt molybdate, manganese molybdate, etc., the adsorption and decomposition steps may be repeated with separate solutions of suitable reagents under conditions suitable for forming such compounds in situ.

It has now been discovered that a more effective electrode may be prepared from carbon and metal by contacting the electrode base with a catalyst yielding solution and then introducing a binder reagent which will react with the metal ions, or with both such ions and the carbon surface, and heating the resulting reaction product. The resulting catalyst-electrode composite is treated with hydrogen or other reducing agent at elevated temperatures of about 800° to 1200° F. as in conventional processes. Precipitation of the catalytic metal in situ in accordance with this process markedly increases the catalytic effect of such metal in promoting fuel cell reactions over conventional impregnation techniques.

The fuel cell reaction comprises the sum of complementary half cell reactions occurring at the anode and cathode, respectively. It is a fundamental principle in the design of fuel cells that the rate of electrochemical reaction depends upon the regions within the cell that are simultaneously exposed to the conductor and catalyst of the anode, the electrolyte and the fuel in the anodic portion of the cell and to the conductor and catalyst of the cathode, the electrolyte and the oxidant in the cathodic portion of the cell. The desideratum is therefore to bring electrolyte, electrode and reactant all into contact with each other at as great a number of sites as possible within the space limitations of the cell.

Carbon was suggested early in the development of the fuel cell as suitable material for electrode construction for the reasons that carbon can be utilized to provide large surface areas per unit of volume and is of itself a relatively good electron conductor. In particular, porous carbon structures have been utilized to provide diffusion type electrodes wherein electrolyte and reactants meet within the porous structure in the presence of a catalyst and react upon the receipt or release of electrons from or to the carbon surface. In a relatively low temperature fuel cell process, i.e. a cell operating at temperatures in the range of 70° F. or below upwards to 400° to 500° F., it has been the practice to associate with the carbon base of the electrode a catalytic element or compound. Among the more effective catalytic electrode systems have been those comprising platinum wherein the platinum is either the sole metal employed or serves as the major catalytic component and is intimately mixed with a minor amount of another noble metal such as gold, silver, iridium, rhodium, palladium, etc. The instant invention, although particularly directed to platinum comprising catalysts, may be advantageously applied with any metal suitable for use as fuel cell catalyst at either anode or cathode in either an acidic or basic system. Thus, all of the metals heretofore disclosed in the art as fuel cell catalysts may be dispersed within and bound to carbon comprising electrode structures in accordance with the process of this invention. A representative list of such metals include the noble metals or mixtures thereof, transition group metal molybdates, and/or chromates, and/or vanadates, and/or tungstates, and transition group metal sulfides. Carbon may also be utilized in non-diffusion or surface contact electrodes in certain fuel cell embodiments, e.g. as the fuel electrode of systems employing an electrolyte soluble fuel. The advantages of increased catalytic effect of metal catalysts applied in accordance with the process of this invention extends to electrodes of this type and to any fuel cell electrode wherein metal is placed upon a carbon surface.

The impregnation of diffusion type carbon electrodes suitable for use in a fuel cell is complicated by the structural requirements of such electrodes. Preferred carbon electrodes have a dual porosity which provides a high volume efficiency. Thus, such electrodes are characterized by having pores distributed mainly in two regions of sizes, namely, diameters of from about 80 to 300 A. and from about 3,000 to 80,000 A. When properly functioning the space within the larger pores is occupied with fuel or oxidant and the space within the smaller pores is occupied by electrolyte. The effectiveness of the electrode is limited by the number of intersections of the smaller pores with the larger pores. The value of the intersection as a reaction site is dependent upon the positioning of catalyst at the interface formed at such intersection by fuel or oxidant with electrolyte and to the effectiveness of the catalyst so positioned. In the preparation of the carbon structures having the desired pore distribution outlined heretofore the carbon is subjected to a high temperature treatment with carbon dioxide and upon cooling the carbon is left with a chemically heterogeneous surface. This surface may comprise in part various adsorbed oxides, e.g. hydroxyl groups, carbonyl groups, as well as exposed carbon atoms leaving a surface which is partially hydrophilic and partially hydrophobic. Simple adsorption techniques therefore do not provide the most effective means for catalyst distribution.

In the instant process the carbon structure to be impregnated with catalyst is first contacted with a solution of the catalyst containing material, e.g. an aqueous solution of a water soluble salt of the desired metal. Examples of metal containing compounds that may be used for this purpose include auric chloride, chloroplatinic acid, iridium chloride or bromide, rhodium chloride, cobalt acetate, ammonium molybdate, ammonium tungstate, etc. Optionally, the carbon structure may first be evacuated to remove some of the adsorbed gases prior to adding the solution (this may be accomplished by nominal heating of the carbon at reduced pressure), or the tightly adsorbed gases such as $O_2$, $H_2O$, etc. may be replaced by loosely held gas molecules such as the rare gases, e.g. argon, helium, and nitrogen. In the treatment of non-porous electrodes reduced pressure is not necessary. Preferably, the adsorption step is effected from a highly dilute solution, e.g. when impregnating with chloroplatinic acid, the solution is in the range of 0.005 to 0.05 molar in platinum over an extended period of time, e.g. in the range of about six hours to 3 days or longer when the system is kept at room temperature. The reagent which facilitates bonding between catalyst agent and base carbon is added after the catalyst is imbibed within the carbon pores and while the carbon structure is still immersed in the original catalyst containing solution or preferably is introduced after draining the catalyst solution while the electrode is still wet. The requirements for the binder reagent are that it will react with the catalyst metal ions which are adsorbed on the carbon surface to form an insoluble entity which is no longer free to migrate throughout the porous carbon structure. The binder reagent should also be compatible with the hydrophilic groups of the carbon surface, i.e. it may replace some of these groups leaving a hydrophilic surface, or it may coexist in equilibrium with the original hydrophilic surface. The materials particularly suitable for use as binder reagents include ionizable sulfides, e.g. ammonium sulfide, hydrogen sulfide, etc. Other reagents that may be used include oxalates, alkalies and acids added in sequence, etc.

After such treatment the electrode is treated at elevated temperatures in an inert atmosphere, e.g. 200° to 1000° F. under nitrogen, as in conventional processes to disassociate the intended catalyst from the binder reagent.

After decomposition the catalyst material is reduced with hydrogen or other reducing agent as in conventional processes, i.e. at temperatures in the range of about 800° to 1200 F.

The electrode is then ready for any of the wetproofing techniques conventionally employed in the art. Wetproofing is carried out to provide the larger pores with a coating of material having a low surface energy to facilitate maintaining gas in such pores to the exclusion of aqueous electrolyte so as to permit intersections of liquid and gas where the small and larger pores intersect. Wetproofing may be carried out by electrodeposition of fluorocarbon polymers or by polymerization of hydrocarbon polymers in situ as described in copending applications, Serial Numbers 23,772, now Patent No. 3,113,048 and 19,569, now abandoned, of co-inventor Charles E. Thompson et al., filled April 21, 1960 and April 4, 1960, respectively.

The following examples are illustrative and should not be construed as limiting the true scope of this invention as set forth in the claims.

*Example 1*

A porous carbon electrode in the form of a cylinder ¾" in diameter and 1¾" in length and with a 15/16" hole of ⅜" diameter drilled into it axially is composited so that it possesses the desired dual pore size regions. This carbon was burned out with $CO_2$ by heating at 1800° F. for six hours. After cooling in $CO_2$ the carbon electrode was impregnated with 0.86% Pt and 0.045% Au by immersing the carbon electrode in a solution of the chlorides of these metals. The solution was about 0.014 molar in platinum and 0.0007 molar in gold. The electrode was left in the mixed solution for 3 days at room temperature. The wet electrode was then transferred to a beaker containing 100 cc. of a 1% ammonium sulfide solution. Suction was applied to the center core of the electrode, pulling the sulfide solution through the pores so that the absorbed metal ions were converted to the corresponding sulfide. After about one hour, the electrode was removed from the liquid, rinsed with water, and dried at 230° F. This electrode is referred to as "A" below.

*Example 2*

A porous carbon was prepared similar in shape and porosity to that described in Example 1. This porous carbon was burned out with $CO_2$ by heating at 1800° F. for six hours. After cooling, in $CO_2$ the catalyst was impregnated with 0.95% Pt-0.05% Au by immersing the carbon electrode in a mixed solution of the chlorides of these metals, as described in Example 1. After adsorption of the ions was complete the electrode was removed from this solution and immersed in 3% $NH_4OH$ solution. Suction was applied to pull the base solution through the electrode. The electrode was left in contact with the solution for 16 hours. The electrode was then withdrawn and dried at 230° F. This electrode is referred to as "B" below. This electrode is offered for comparative purposes to show that the ammonium ion, which is common in the preparation of both "A" and "B," does not exert any influence on the ultimate electrode performance.

*Example 3*

Electrodes "A" and "B" were used as fuel electrodes in an ethane-oxygen cell operated at 180° F., atmospheric pressure, using 30% $H_2SO_4$ electrolyte. The electrodes were reduced by heating in hydrogen at 1000° F. for 4 hours before use. The results are summarized as follows.

| Electrode | Current Density, Max., Amps./Ft.$^2$ | Volts Polarization[1] at Amps./Ft.$^2$ | | |
|---|---|---|---|---|
| | | 0 | 5 | 10 |
| A | 19.5 | 0.28 | 0.38 | 0.49 |
| B | 6.8 | 0.35 | 0.55 | ([2]) |

[1] Versus theoretical ethane at 180° F. in 30% $H_2SO_4$.
[2] This current density could not be achieved with this electrode in this system.

Thus, it is seen that superior electrode performance is obtained from a Pt-Au on carbon electrode when the active metals are precipitated in situ with a suitable binder reagent, in this case as the sulfide.

*Example 4*

Electrodes "A" and "B" from Example 3 were washed free of electrolyte and dried at 230° F. On cooling the electrodes were Teflon (polytetrafluoethylene) coated by electrodeposition of small polymer particles. The electrodes were then tested as oxygen electrodes in an $H_2$—$O_2$ cell operated at 180° F., atmospheric pressure, and 30% $H_2SO_4$ electrolyte.

| Electrode | Volts Polarization,* at Amps./Ft.$^2$ | | |
|---|---|---|---|
| | 0 | 50 | 100 |
| A | 0.12 | 0.22 | 0.24 |
| B | 0.17 | 0.30 | 0.34 |

*Versus theoretical oxygen under test conditions.

It is seen directly that superior performance is exhibited by electrode "A" which is made by the teachings of this invention.

The term "electrochemical cell" as employed herein refers to an apparatus for the transformation of chemical energy into electrical energy or the reverse which includes a cell container, an electrolyte, and immersed in the electrolyte a cathode by which electron flow enters the cell and an anode by which electron flow leaves the cell, a transfer of ions through the electrolyte resulting between cathode and anode.

The term "fuel cell" as employed herein refers to an electrochemical cell wherein chemical energy is converted directly to electrical energy by an electrochemical (anodic) oxidation of a combustible fuel and comprises a cell container, an anode and a cathode within such container, an electrolyte providing means for ion transfer between anode and cathode, conducting means external to said electrolyte for establishing electrical connection between anode and cathode, means for admitting a combustible fuel into dual contact with anode and electrolyte and means for admitting an oxidizing gas into dual contact with cathode and electrolyte.

The term "electrolytic cell" as employed herein refers to a power-consuming electrochemical cell in which an organic feedstock is oxidized and wherein electrical energy is provided to the cathode from an outside source in contrast to a fuel cell, hereinbefore defined, which generates electrical energy and is provided with fuel and oxidant from an outside source.

The term "combustible fuel" as employed herein shall include hydrogen, carbon monoxide, hydrocarbons and substituted hydrocarbons retaining at least one hydrogen atom in their molecular structure.

The terms "anode" and "fuel electrode" are used interchangeably herein.

What is claimed is:

1. A process of preparing an improved carbon electrode which comprises contacting said electrode with an aqueous solution of a salt of a catalytic metal, which forms an insoluble sulfide, until the metal ion of said salt is adsorbed on said electrode, contacting the electrode with an ionizable sulfide until said metal ion is converted to the corresponding insoluble metal sulfide on the electrode surface, heating the electrode in an inert atmosphere at a temperature of about 200° to 1000° F., heating the electrode with hydrogen at an elevated temperature in the range of about 800° to 1200° F.

2. A process as in claim 1 wherein the catalytic metal is a noble metal.

3. A process as in claim 2 wherein the catalytic metal is platinum.

4. A process as in claim 1 wherein the catalytic metal is molybdenum.

5. A process as in claim 1 wherein the catalytic metal is platinum and the ionizable sulfide is ammonium sulfide.

6. An electrode prepared by soaking a porous carbon structure in an aqueous solution of a salt of a catalytic metal, which forms an insoluble sulfide, until the metal ion of said salt is adsorbed on said carbon structure, contacting said carbon structure with an ionizable sulfide until said metal ion is converted to the corresponding insoluble metal sulfide, heating the resulting structure to decompose said sulfide and contacting the resulting structure with hydrogen gas at a temperature between about 800° and 1200° F.

References Cited by the Examiner

UNITED STATES PATENTS

| | | | |
|---|---|---|---|
| 934,988 | 9/1909 | Adolph et al. | 204—294 |
| 2,938,064 | 5/1960 | Kordesch | 136—122 |

JOHN H. MACK, *Primary Examiner.*

D. R. JORDAN, *Assistant Examiner.*